United States Patent [19]

Newsteder

[11] Patent Number: 4,668,521

[45] Date of Patent: May 26, 1987

[54] METHOD OF FORMING AN IMAGE WITH PHOTOGRAPHIC LIKENESS ON CHOCOLATE

[75] Inventor: Robert Newsteder, Utica, N.Y.

[73] Assignee: Chocolate Pix, Inc., Utica, N.Y.

[21] Appl. No.: 892,994

[22] Filed: Aug. 1, 1986

Related U.S. Application Data

[63] Continuation-in-part of Ser. No. 707,552, Mar. 4, 1985, abandoned.

[51] Int. Cl.[4] ............................................. A23G 1/22
[52] U.S. Cl. ...................................... 426/87; 426/104; 426/93; 426/96; 426/103; 426/383; 426/249; 426/515; 426/289; 264/219; 264/225; 101/170; 430/307
[58] Field of Search ............... 426/383, 515, 104, 414, 426/87, 249, 289, 93, 96, 103; 425/177; 264/219, 220, 225, 226, 227; 101/32, 170; 249/55, 127; 156/658; 430/307

[56] References Cited

U.S. PATENT DOCUMENTS

| 495,341 | 4/1983 | Ives | 101/150 |
|---|---|---|---|
| 727,435 | 5/1903 | Pietzner | 264/219 |
| 1,502,006 | 7/1924 | Alvord | 426/104 |
| 1,792,486 | 2/1931 | Feinberg | 264/225 |
| 2,147,770 | 2/1939 | Ford | 264/219 |
| 2,181,452 | 11/1939 | Ford | 264/219 |
| 2,294,865 | 9/1942 | Frankenthal et al. | 264/219 |
| 2,952,225 | 9/1980 | Ellison | 426/383 |
| 3,101,668 | 8/1963 | Leeds | 264/226 |
| 3,251,319 | 5/1966 | Kaupert et al. | 426/515 |
| 3,277,541 | 10/1966 | Wilton et al. | 264/227 |
| 3,739,051 | 6/1973 | Smith | 264/225 |
| 4,144,300 | 3/1979 | Breeden | 264/219 |
| 4,200,658 | 4/1980 | Katzman et al. | 426/515 |
| 4,455,320 | 6/1984 | Syrmis | 426/515 |

FOREIGN PATENT DOCUMENTS

| 605596 | 10/1925 | France | 426/383 |
|---|---|---|---|
| 2334509 | 8/1977 | France | 426/383 |
| 2453030 | 12/1980 | France | 426/383 |
| 49-20858 | 5/1974 | Japan . | |
| WO82/00083 | 1/1982 | PCT Int'l Appl. | 426/104 |
| 161740 | 4/1921 | United Kingdom | 426/383 |
| 628886 | 9/1949 | United Kingdom | 426/383 |

OTHER PUBLICATIONS

Paper World, 3/1888, 156/658.
Swiss Colony, 1979, pp. 104–107, 426/104.

Primary Examiner—Steven Weinstein
Attorney, Agent, or Firm—Cobrin & Godsberg

[57] ABSTRACT

A method of forming an image with photographic likeness on a chocolate material is disclosed. The image is "developed" on the chocolate material by means of an edible developer.

9 Claims, 15 Drawing Figures

METHOD OF FORMING AN IMAGE WITH PHOTOGRAPHIC LIKENESS ON CHOCOLATE

CROSS REFERENCE TO RELATED APPLICATIONS

This application is a continuation-in-part of my co-pending application Ser. No. 06/707,552, filed Mar. 4, 1985, now abandoned, in the name of Robert Newsteder for an invention entitled IMAGING ON A CASTABLE SUPPORT MATERIAL.

BACKGROUND OF THE INVENTION

This invention relates to a process for producing a photographic quality likeness of a photographic image on the surface of a chocolate candy.

Images are typically created in castable materials by simply casting the material against a mold surface having a pattern cut or otherwise formed therein. The mold pattern is a reversal of the desired image to be reproduced. The quality of the final image is to a large extent dependent upon the amount of detail that is contained in the mold pattern. High quality molds require a good deal of fine detail and are very expensive to construct. Because of the mold costs involved, these quality molds are typically used in the manufacture of high priced items, or those that can be mass produced and sold on a high volume basis.

In the case of molded candies or wax figures of the type traditionally sold on holidays, such as Christmas and Easter, where the items are both inexpensive and consumable, the cost of a high quality mold cannot ordinarily be justified unless a very large sales volume of a specific item is anticipated, such as plastic molded items, certainly not "customized" items of the type involving photos, etc. Inferior molds are therefore generally used in fabricating low priced items or limited quantity items and, as a consequence, the image recorded upon the final support material lacks detail and is relatively poor. Manufacturers of candies and the like sometimes place the company name or logo in the product using a die or some other device capable of producing a line art replication of the design. These processes, however, are incapable of recording what might be termed photographic quality images on the castable material.

U.S. Pat. No. 4,200,658 issued to Sandra Katzman, et al. on Apr. 29, 1980 discloses a method for making candy (hereinafter "the Katzman patent"). The Katzman patent is intended to make novelty chocolate items but simply is not up to the task of making chocolate having a photographic likeness image formed thereon which can be "developed" at will by a person.

In the Katzman patent, a continuous tone photograph of the type that would be obtained with a regular hand-held camera is first attained. The next step in the Katzman patent is to convert the photographic print into a line art drawing. This requires the services of a skilled artist and the final result is limited by both artistic subjectivity and budget. A typical charge to convert a photographic portrait of a person to a line art drawing of the type contemplated by the Katzman patent would be in the area of $100 to $150, depending upon the skill of the artist and the quality of the work. This, of course, could vary depending on many factors. Without the conversion of the photographic print into a drawing of line art work, the Katzman process comes to a total halt. A sample mold including line art work according to the Katzman process would oost approximately $500 to $1,000.

Furthermore, with the Katzman patent it is impossible to get an image that can be "developed" by applying an edible "developer" to the chocolate product which enables a person, upon application of the developer, to see the image which was previously not visible. In the Katzman patent, the chocolate simply does not produce an image having photographic likeness.

For all of these reasons, the Katzman patent is of limited utility and commercially undesirable in forming photographic likeness images on chocolate products.

SUMMARY OF THE INVENTION

It is an object of the present invention to economically create a quality photographic image with apparent continuous tone in the surface of a chocolate material where the image can be made visible by means of an edible developing medium, thus enhancing the desirability of the chocolate product.

As used herein, "photorelief imaging" means the formation of a relief image on a photosensitive element wherein such photosensitive element may be a photoengraving plate, a photopolymer, etc.

According to one aspect of the present invention, a method of reproducing in chocolate a selected image from a fulltone photograph with photographic likeness includes the step of forming on film a halftone image of the selected fulltone image located on the photograph. The selected halftone image on the film is photorelief imaged in a photosensitive element such that peaks and valleys are created in the photosensitive element corresponding to the selected image. A deformable transfer blanket is cast against the photosensitive element surface to record in a surface of the transfer blanket peaks and valleys corresponding to the selected image. A chocolate material is cast against the surface of the transfer blanket to record the selected image by peaks and valleys in the surface of the chocolate. An edible developer that contrasts in color with the chocolate is placed in the valleys formed in the chocolate with the chocolate peaks protruding above the developer to render the image formed in the chocolate visible with photographic likeness.

BRIEF DESCRIPTION OF THE DRAWINGS

For a better understanding of these and other objects of the present invention, reference is had to the following detailed description of the invention which is to be read in conjunction with the associated drawings wherein.

DESCRIPTION OF THE INVENTION

Figure 1:
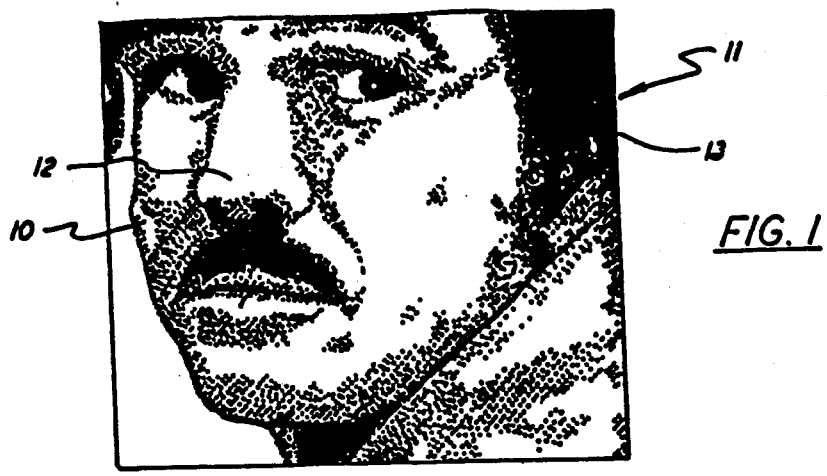
FIG. 1 is a partial view showing a halftone image that has been prepared from a continuous toned photograph of an original wherein the tonal quality of the image is defined by a plurality of cells in a dot matrix pattern equally spaced but of varying sizes.

The present invention shall be described with particular reference to a process for faithfully recording image information in the surface of chocolate to provide, a high quality replica of the original. As will become evident from the disclosure below, the present imaging process can be used to create photographic likenesses of a selected image in chocolate. Because the present image recording process can be rapidly and economically carried out, it is ideally suited for use in the manufacture of many kinds of low volume inexpensive consumable items such as chocolate novelty items. The present image recording process will be herein described with particular reference to recording a photograph-like portrait of a person upon a chocolate greeting card and developing the recorded image using an edible confectionary. The portrait depicted in the drawings is that of a male character having a head of hair and a heavy mustache and other prominent features that are brought out by tonal qualities of the image.

Until the development of the instant process, candy portraits were limited to likenesses done in caricature using rather crude procedures. The images recorded on the candy support were of extremely poor quality and the production of anything approaching a true likeness of the original was generally unattainable. By contrast, employing the technique of the present imaging process allows a photographic image original to be recorded upon chocolate bars, chocolate lollipops and the like at a cost that is not prohibitive. The starting original can be a black-and-white photograph or a color picture showing a well-defined image of the original. The photograph as initially recorded on film contains a continuous tone image along with an infinite number of tonal shades ranging between these extreme light and dark values.

As is well-known in the printing art, continuous tone photographs can be reproduced in a large number of mediums such as newsprint and magazines. The continuous tone original is first converted into a halftone image which, unlike line art, creates the effect of continuous tone to the eye.

Although the present invention does not involve a printing process, in one embodiment the initial steps in recording the image can be similar to those used in the printing art in that an etched halftone image of the original is initially produced in a photoengraving plate. The picture 10 shown in FIG. 1 is a halftone image of the original that has been created upon a transparent material 11 using well-known halftone imaging techniques. As can be seen, the halftone image is a portrait of a person and clearly brings out the tones found in and about the facial region. The region along the bridge of the nose, for example, is highlighted and contains smaller cells or dots. The hair region at 13, however, which is dark, contains larger dots and therefore appears dark to the eye. Between these two extremes, the size of the dots in the pattern varies to bring out different tonal gradations depicting other facial features. The end result is a high quality image that is of photographic quality faithfully capturing the details found in the original.

The transparency bearing the halftone portrait of the original is employed in the process to expose a photoengraving plate that has been coated with an insoluble light-sensitive photo-etch material. The plate is preferably made of magnesium or aluminum, both of which react predictably with known acids. The transparency is placed over the photosensitive coating and the coating is exposed through the transparency to ultraviolet light or light at a wavelength that will react with the coating to render it soluble in the light-exposed regions. A latent image of the halftone image is thus recorced on the plate surface with the light or clear (as in a transparency) regions being recorded as soluble areas and the dot regions as insoluble regions. The exposed plate is washed with a suitable solvent to remove the coating in the unexposed regions, thereby revealing the underlying metal. The exposed coating remains.

The washed plate is now placed in an acid bath and the acid is allowed to attack the unprotected metal for a sufficient period of time to produce relatively deep recesses in the exposed region. The depth of the etch is considerably greater than that used in preparing a printing plate. The reason for the deep etch will become apparent from the disclosure below.

Figure 2:
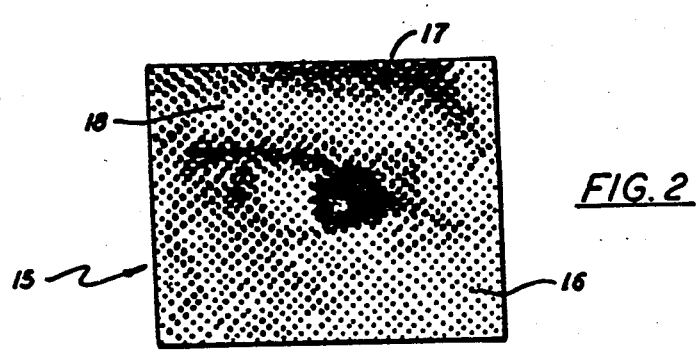
FIG. 2 is a partial view showing a portion of an etched photoengraving plate that has been exposed to a halftone image of an original and then etched or washed so that the cells appear as raised peaks terminating in the plane of the plate surface and being connected by recesses etched or washed in the plate to a desired depth.

When the etch has reached a desired depth, the plate is removed from the bath and the residual acid on the plate is neutralized with water. The plate is then dried. The coating will normally be allowed to remain on the plate. FIG. 2 shows a portion of the etched plate 15 illustrating a region about the subject's eye greatly enlarged.

As can be seen, the halftone dots are represented as raised cells 16, each one of which is terminated or cut off in the plane described by the top surface of the plate. The cells, where they do not blend together to provide solid area coverage, such as at the eyebrow 17, are connected by recesses 18. As clearly seen, highlighted areas contain smaller cells or dots, while shadow areas contain heavy solid area dot coverage. It should be carefully noted that because of this etching process, the peak of the dots making up the halftone pattern are all cut off in a common plane. This is an extremely important step in the instant process which allows the image to be ultimately transferred to the final support without loss of quality or image fidelity. If a reversal of the original were used to expose the plate, the dots would be depicted by the etched recesses. As should be evident, the depth of the recesses will vary and, more importantly, the bottom of each recess will be generally ragged and non-uniform. As will become apparent from the disclosure below, the image finally recorded on the support material using the transfer step of the invention would be made up of a series of jagged peaks of non-uniform height in which the information would either be faintly visible or totally lost.

Figure 3:
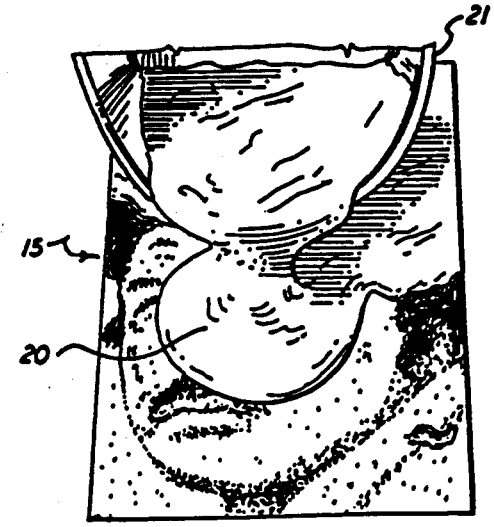
FIG. 3 is a view showing a flexible mold material being poured against the imaged surface of the plate shown in FIG. 2 to create a transfer plate bearing a reverse image of the original.

The etched plate bearing the halftone dot pattern is used to generate a second transfer plate or blanket which is used to transfer the true image of the original recorded on the first etched plate 15 onto the final support material. To prepare the transfer blanket, a rubber-like mold material 20 which is self-curing is poured over the imaged surface of etched plate 15 as shown in FIG. 3. Of course, other materials may be used for the transfer blanket, such as silicone in uncured sheet form.

Figure 4:
FIG. 4 shows the imaged face of the flexible transfer plate after it has cured against the etched plate.

Although not shown, the plate 15 may be enclosed by a raised frame during the pouring process which contains the flexible mold material within the imaged region. The mold material is poured to a desired thickness and then allowed to cure against the imaged plate surface. The mold material is able to fill the recesses between the cells formed in the plate and thus records a reverse image of the original in the molded face of the transfer blanket. Here again, it is important to note that the tops of the cells all terminate in a common plane residing inside the blanket. After curing, the blanket or intermediate plate is peeled back from the etched plate. As illustrated in FIG. 4, the image recorded in the molding face of the transfer blanket 25 shows the original dark areas as being recessed 27 and the original light areas as being raised 28.

The transfer blanket 25 may be fabricated from any number of well-known rubber-like synthetic materials that are capable of curing against an imaged plate as described above to create an imaged strip suitable for use in a downstream molding process. Urethane or silicone materials of this nature are readily available under a number of different trade names. The cured blanket should exhibit high tear strength and sufficient flexibility to permit it to be peeled away from the etched plate or a final support material without damaging the image recorded therein. This combination of strength and flexibility is important when the blanket is used to mold certain hard plastics or the like that might tend to tear the mold, particularly in the imaged regions, during separation.

Figure 5:
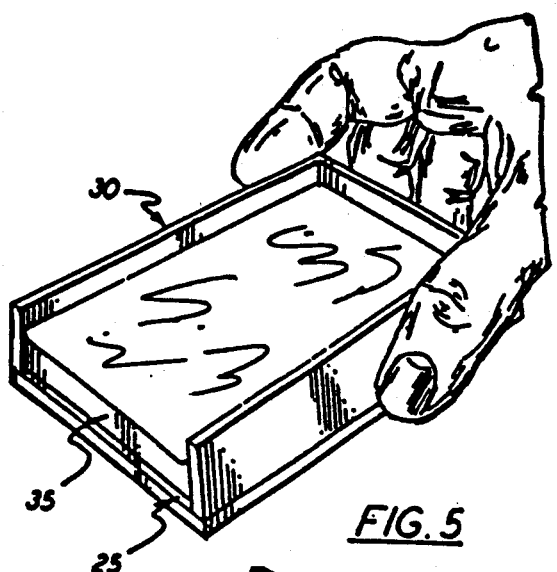
FIGS. 5-8 illustrate the steps in using the transfer plate for a true image of the original photograph in a final support material.

Turning now to FIGS. 5–8, the flexible transfer blanket 25 is used to create a true image of the original in a castable final support material which, for the purpose of this disclosure, will be chocolate candy. The imaged blanket is mounted with its imaged face up in the bottom of a molding tray 30 (FIG. 5), one side of which has been removed so that the inside of the tray can be more clearly viewed. The blanket is shown seated in a flat plane in the bottom of the tray. However, because of its flexibility, the blanket can be wrapped or seated upon a curved backing wall when arcuate-shaped articles such as candies or lollipops are being manufactured, provided that the plane in which the cells terminate describes a smooth continuous surface that will not distort the image to any great extent. As illustrated in FIG. 5, the final support material, which in this case is chocolate, is poured into the mold over the mold face of the transfer blanket to a desired depth.

Figure 6:
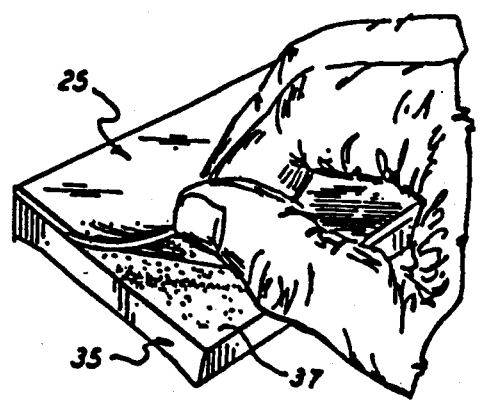
Figure 7:
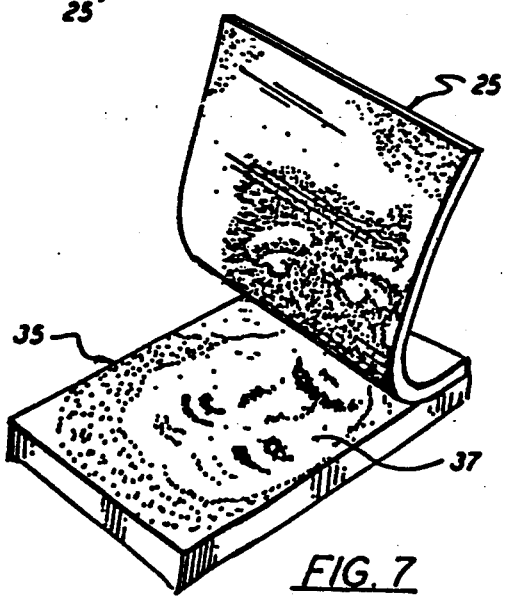
Figure 8:
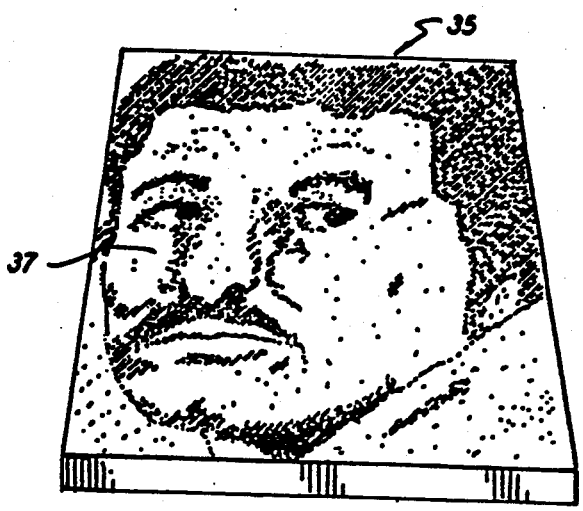

After the block of chocolate has solidified or hardened, it is removed from the tray along with the transfer blanket 25. As shown in FIG. 6, the blanket is removed from the chocolate simply by pulling up one corner of the blanket and carefully peeling the blanket away from the top surface 37 of the chocolate. Here again, the flexibility of the mold strip comes into play. The strip should have a low enough durometer (softness) so that as it is being pulled away from the chocolate it will not physically damage the raised peaks embossed in the chocolate which define the halftone gradations. FIG. 7 shows the strip in the final stages of removal and the faint but discernible image that is left behind in the chocolate support material. FIG. 8 shows the imaged block of chocolate tilted to emphasize the shadows and thus more clearly outline the recorded image. As can be seen, the image is a faithful halftone replica of the original that accurately displays all the facial features found in the original subject matter. The fidelity of the image is comparable to that of a photograph appearing in newsprint or magazines and thus provides a picture of a quality infinitely greater than anything now available in the art for manufacturing low priced items.

Figure 9:
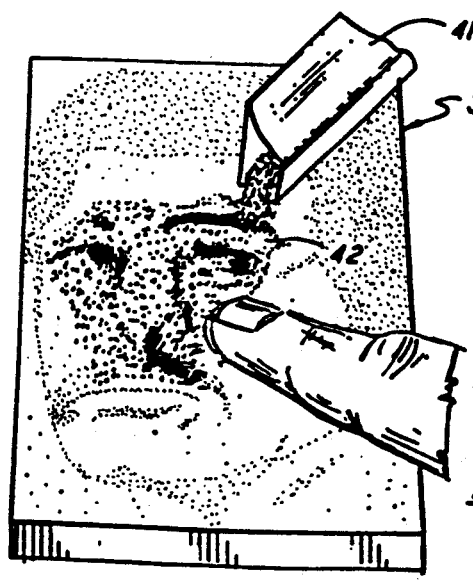
FIG. 9 illustrates an image support material that has been developed by placing a colored filler in the recesses formed between the raised density cells.

FIG. 9 illustrates one means of developing the image recorded in the chocolate support material. Typically, the contrast between highlights and shadows is low on a single color support material, particularly where the support is dark, as here. To develop or bring out the image data, a different colored filler is placed in the recesses formed between the raised cells in the imaged region. In the case of a dark chocolate, a white or light tinted filler would be used which can be tapped onto the chocolate by a finger. The reverse would be true if the chocolate were light (white chocolate).

As shown in FIG. 9, a white powdered sugar 42 is sprinkled from a container 41 over the imaged surface 37 of the support so that the powder completely fills or, preferably, overfills the recesses. The imaged surface is then lightly squeegeed using any suitable means to remove the filler from the tops of the cells. As noted above, all cells terminate in a common plane which, because of the double image transfer process, now lies in the plane described by the top surface of the support. Accordingly, the squeegeeing will clear the top of the support to reveal an extremely clear, high quality image of the original. As can be seen, if the cell peaks terminated in other than a smooth continuous plane, the image quality would be severely degraded, the peaks of at least some of the cells would be easily broken and developing of the image with a filler practically useless. Although a white powdered sugar is shown in this embodiment of the invention, tinted icings, such as those used to frost cakes and cupcakes, can also be used effectively as fillers. These icings can be easily wiped from the top of the cells and will set up in the recesses to provide a long-lasting developer that is not readily dislodged. Fusible filler can also be used which can be heated or otherwise treated so as to bond to the support material.

Figure 10:
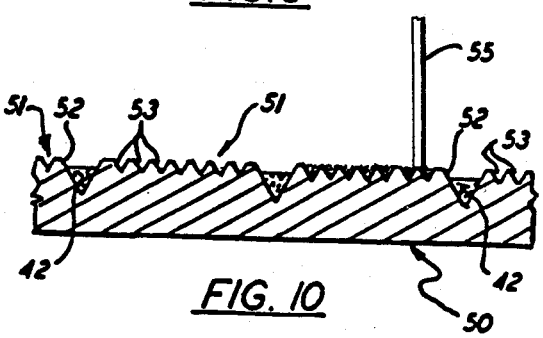
FIG. 10 is a partial enlarged side view in section of a final support that has been further treated to hide the recorded information until such time as the filler is placed in the recesses.

When using the image support as a greeting card, it might be desirable to have the recipient develop the image himself or herself. The image, it has been found, can be hidden from view until after development by randomly forming a series of shallow indentations in the imaged surface of the final support material. The shallow indentations will reside at the top of the cell peaks and, prior to development, hide or mask the image information contained in the cells. As illustrated in FIG. 10, the final support 50 is cast as explained above to create recesses 52—52 between peak regions 51—51 formed of single or merged cells. A series of shallow indentations 53—53 are placed in the peaks. As shown, the indentations are extremely shallow when compared to the recesses and are randomly dispersed so that they will not carry any intelligent information. The image data, however, will be lost in the random pattern. To render the image visible, the developer is placed on the imaged surface of the support, as explained in conjunction with FIG. 9, and the surface lightly squeegeed using paper or a business card or some other device that performs squeegeeing 55. Light squeegeeing will remove the developer from the cell peaks and shallow indentations to reveal a clear sharp image.

Figure 11:
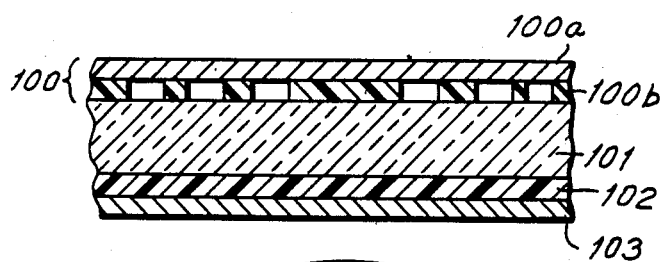
FIGS. 11-15 illustrate a further embodiment of the present method.

While the embodiment of the invention just described produces photographic likeness images in the surface of chocolate material, an alternative embodiment is described herein which likewise produces photographic likeness images in chocolate. In the alternative embodiment shown in FIGS. 11-15, as with the first embodiment shown in FIGS. 1-10, a continuous tone photograph is utilized to form a halftone image thereof on a film. The film in FIG. 11 is identified by the reference numeral 100 and includes a base 100a and an emulsion 100b. The film is placed over a photosensitive element 101 which, in this case, is a photosensitive photopolymer. Examples of such a photopolymer would be Du-Pont Cyrel, UniRoyal Flexlight, TOK made by Miraclon of Japan and Toyoba of Japan. In addition, BASF of Germany and Toray of Japan, respectively, each have a photopolymer which would be suitable. If desired, liquid photopolymer could be used. The base 102 of the photopolymer is pre-exposed to preharden the same. Beneath base 102 is a bonded metal strip 103 for support purposes.

Figure 12:
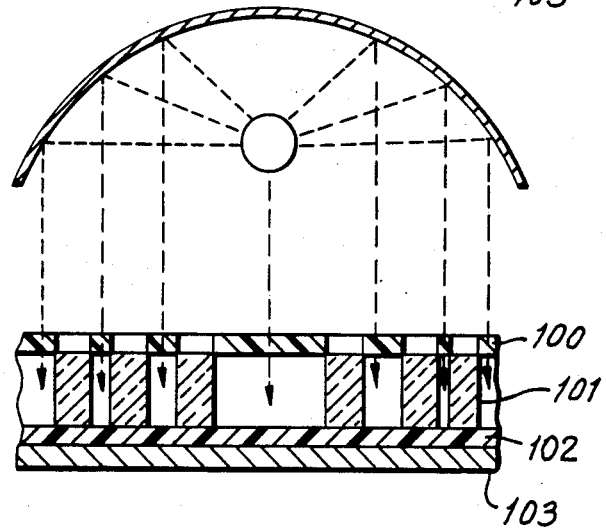

As shown in FIG. 12, located above film 100 is a source of ultraviolet light 104 which is energized for a preselected amount of time so that an image on the photopolymer will be formed which corresponds to the image found on film 100. After the photopolymer has been exposed, the unexposed areas of the photopolymer are washed away with water, or suitable chemicals if a water washout is not used, with the exposed areas in raised peaks as shown in FIG. 12. Alternatively, high-intensity steam or brushes may be used to wash away the unexposed areas. The photopolymer photosensitive element will now have on it peaks and valleys which correspond to the halftone image found in the film.

Figure 13:
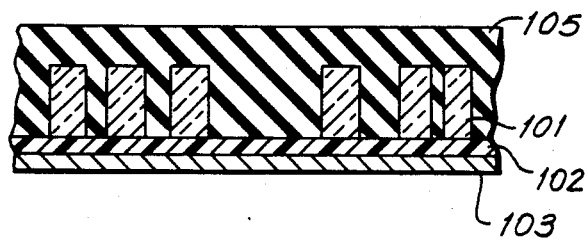
Figure 14:
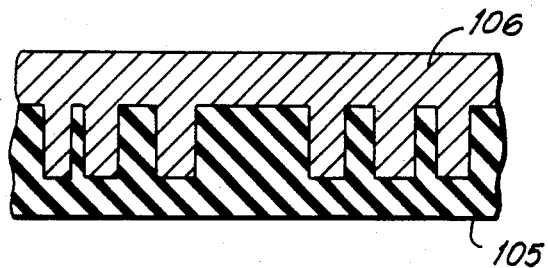
Figure 15:
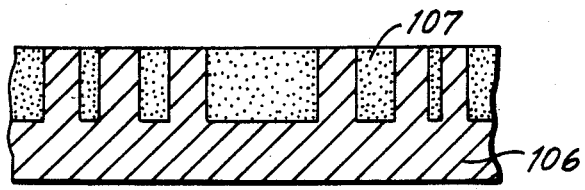

As can be seen in FIG. 13, the photopolymer has relief-formed valleys which generally have straight sides, a flat bottom and are uniform. The advantage of this, of course, is that the image formed from the photopolymer element has a very high quality photographic likeness. It is important to note that the tops of the peaks are formed in a common plane.

The next step in the process is to cast a silicone rubber 105 transfer blanket onto the photopolymer to form an image on the silicone rubber by peaks and valleys that correspond to the image on the film and which is a reversal thereof. If desired, the photopolymer may be enclosed by a raised frame during the casting of the silicone rubber thereon. The silicone rubber will be formed to a desired thickness and allowed to cure against the photosensitive element. Here again, it is important to note that the tops of all the peaks are in a common plane. Chocolate 106 is then cast onto the silicone rubber which will have an image formed thereon by means of peaks and valleys which is a reversal of the image on the silicone rubber. Because of the uniformity of the indentations on the silicone rubber transfer blanket, the chocolate indentations will likewise be uniform and the peaks at the same height.

When the chocolate is cast onto the silicone rubber transfer blanket, a frame can be placed about the blanket, as was previously described herein. The chocolate will be cast to the desired thickness and allowed to harden.

A confectionary product 107 which has a coloration distinct from that of the chocolate is placed on top of the chocolate product and squeegeed or otherwise removed from the top surface of the chocolate product so that it only fills the indentations thereon. The effect this has is of instantly developing the image formed on the chocolate. Alternatively, heat or hot moisture can be applied to the formed image causing the white to be whiter and the dark to be darker, which increases the photographic likeness.

I claim:

1. A method of reproducing in chocolate a selected image from a fulltone photograph with photographic likeness that includes the steps of forming on film halftone image of the selected image located on the photograph, photorelief imaging the selected halftone image on the film in a surface of a photosensitive element such that peaks and valleys are created in the photosensitive element surface corresponding to the selected image, casting a deformable transfer blanket against the photosensitive element surface to record in a surface of the transfer blanket peaks and valleys corresponding to the selected image, casting a chocolate material against the surface of the transfer blanket to record the selected image by peaks and valleys in a surface of the chocolate, removing the cost chocolate material from the transfer blanket, placing an edible developer that contrasts in color with the cast chocolate in the valleys formed in the chocolate with the chocolate peaks protruding above the developer to render the selected image formed in the chocolate visible with photographic likeness.

2. A method according to claim 1 wherein all the peaks in the chocolate terminate in a common plane.

3. A method according to claim 1 wherein said photosensitive element is a photoengraving plate and the step of photorelief imaging is accomplished by means of etching.

4. A method according to claim 1 wherein the photosensitive element is a photosensitive photopolymer.

5. A method according to claim 1 wherein the edible developer is confectionary or powdered sugar.

6. A method according to claim 1 wherein the deformable transfer blanket is fabricated from a synthetic rubber.

7. The chocolate product by the method of claim 1.

8. A method of producing in chocolate a selected image from a fulltone photograph with photographic likeness that includes the steps of forming on film a halftone image of the selected image located on the photograph, photorelief imaging the selected halftone image on the film in a surface of a photosensitive element such that peaks and valleys are created in the photosensitive element surface corresponding to the selected image, casting a deformable transfer blanket against the photosensitive element surface to record in a surface of the transfer blanket peaks and valleys corresponding to the selected image and casting a chocolate material against the surface of the transfer blanket to record the selected image by peaks and valleys in a surface of the chocolate.

9. The product by the method of claim 8.

* * * * *